L. S. D'ORSOGNA & P. CANE.
PATTERN FOR DRAFTING AND FITTING GARMENTS.
APPLICATION FILED JUNE 28, 1911.

1,078,087.

Patented Nov. 11, 1913.

6 SHEETS—SHEET 2.

Witnesses—
William A. Rivori.
Willes Burrowes.

Inventors—
Louis S. d'Orsogna
Pietro Cane
by their Attorneys
Howson & Howson

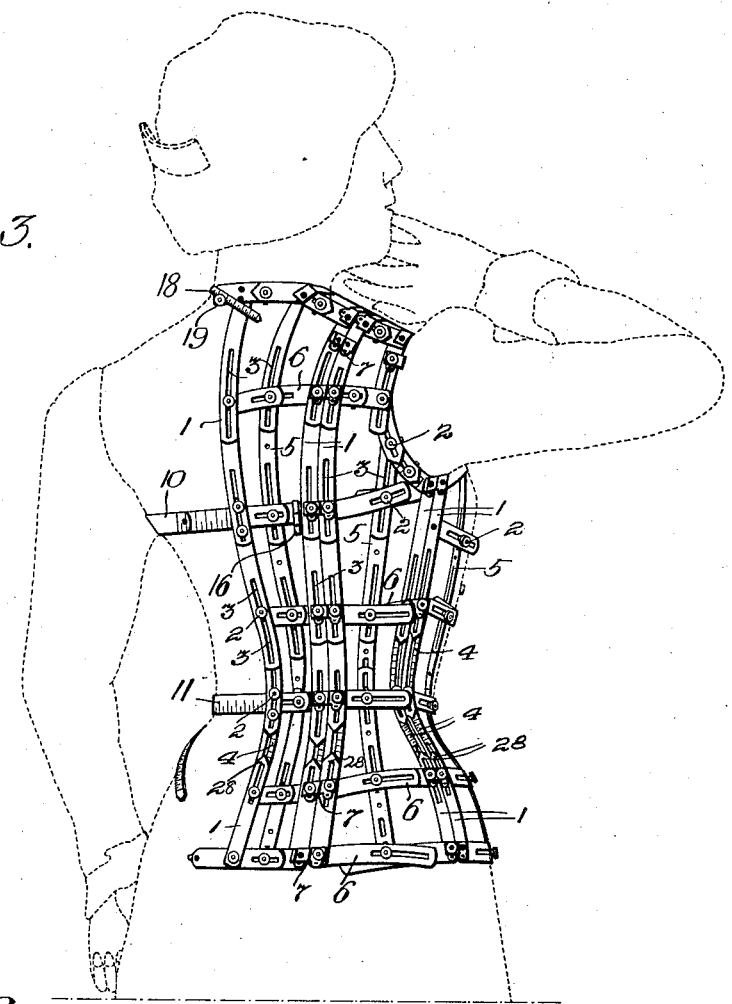

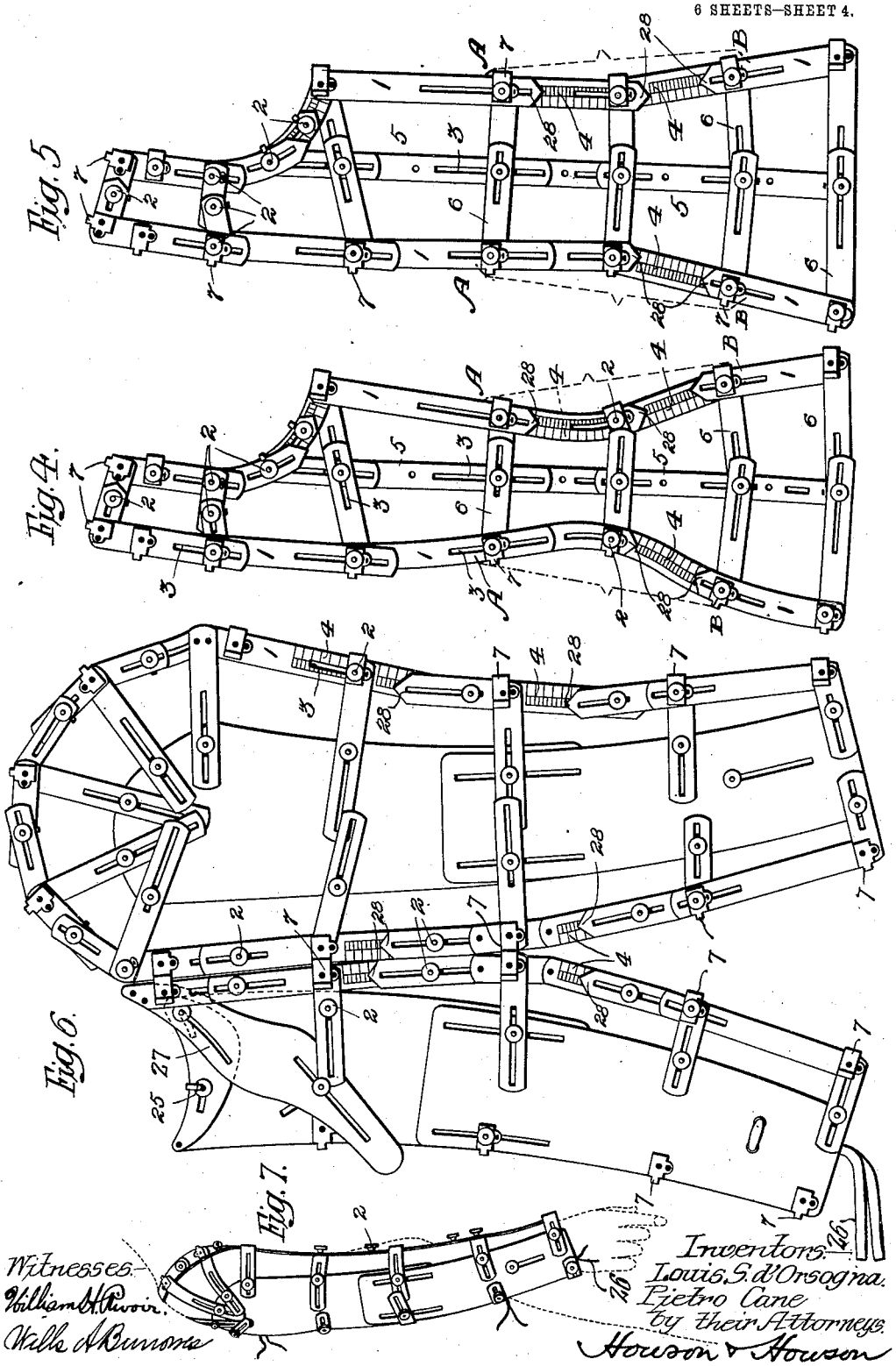

L. S. D'ORSOGNA & P. CANE.
PATTERN FOR DRAFTING AND FITTING GARMENTS.
APPLICATION FILED JUNE 28, 1911.
1,078,087.
Patented Nov. 11, 1913.
6 SHEETS—SHEET 5.
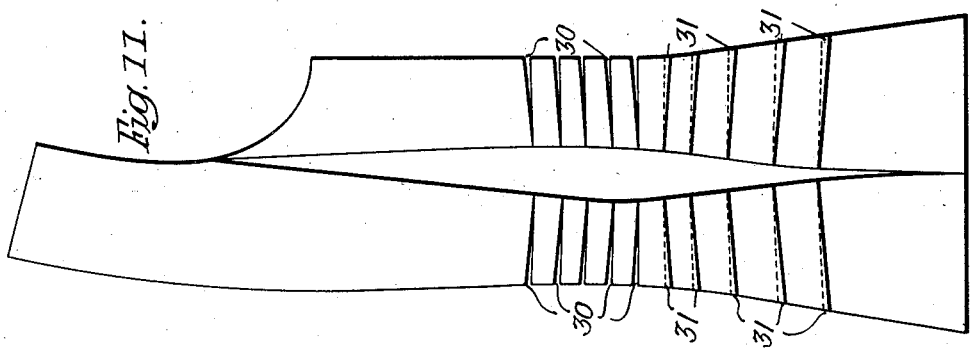
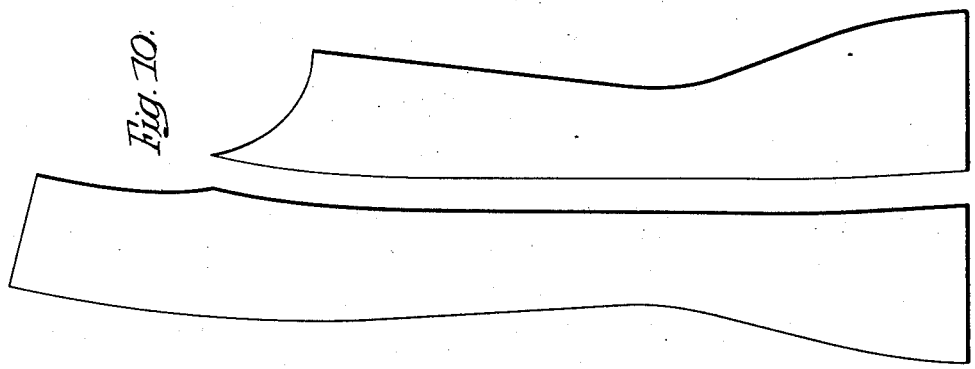
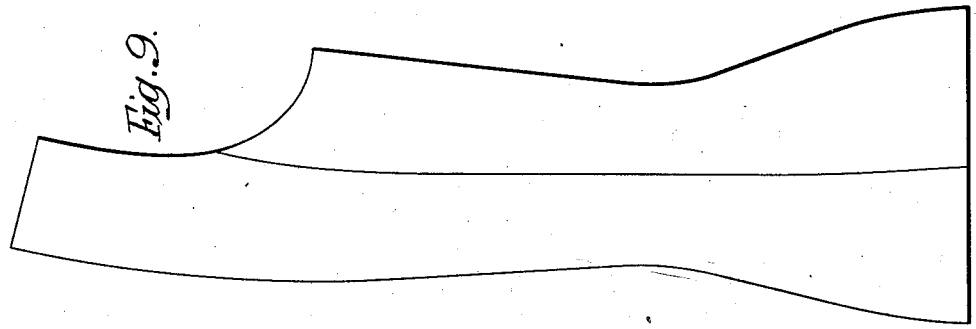
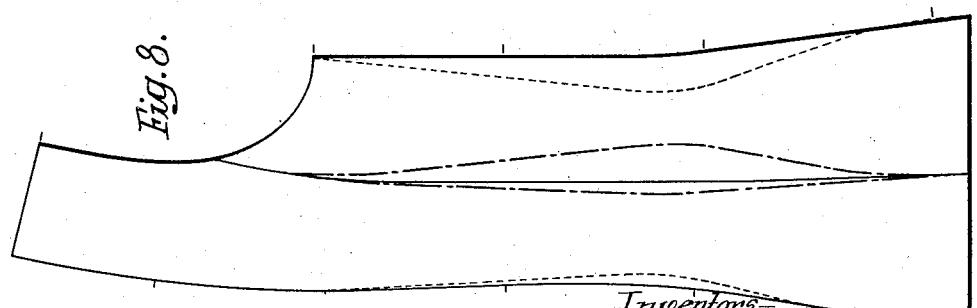

L. S. D'ORSOGNA & P. CANE.
PATTERN FOR DRAFTING AND FITTING GARMENTS.
APPLICATION FILED JUNE 28, 1911.
1,078,087.
Patented Nov. 11, 1913.
6 SHEETS—SHEET 6.
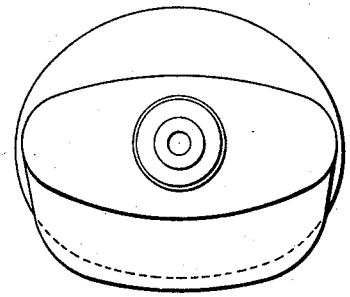
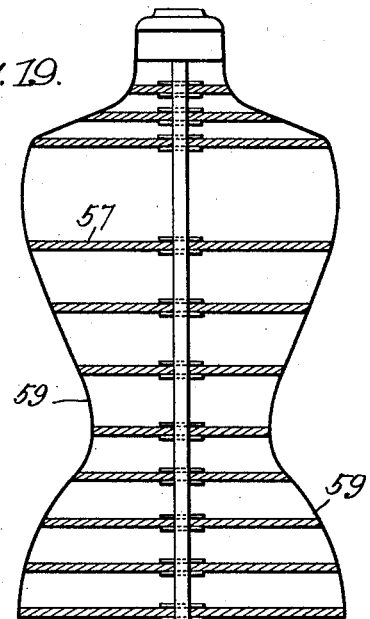
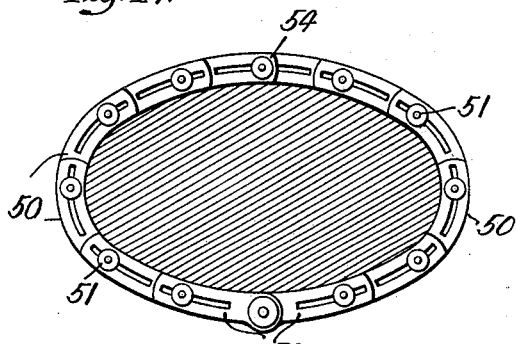
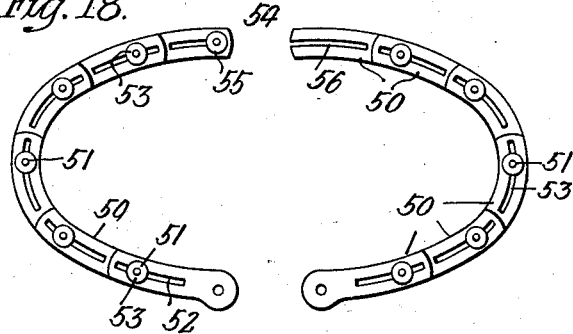
Witnesses
William H. Rivori.
Will A. Burrows
Inventors
Louis S. d'Orsogna.
Pietro Cane.
by their Attorneys
Howson & Howson
COLUMBIA PLANOGRAPH CO., WASHINGTON, D. C.

UNITED STATES PATENT OFFICE.

LOUIS S. D'ORSOGNA AND PIETRO CANE, OF CONEY ISLAND, NEW YORK, ASSIGNORS TO NICHOLAS D'ORSOGNA, OF BROOKLYN, NEW YORK.

PATTERN FOR DRAFTING AND FITTING GARMENTS.

1,078,087.

Specification of Letters Patent.  Patented Nov. 11, 1913.

Application filed June 28, 1911. Serial No. 635,842.

*To all whom it may concern:*

Be it known that we, LOUIS S. D'ORSOGNA and PIETRO CANE, citizens of the United States, and residents of Coney Island, Kings county, New York, have invented certain Improvements in Patterns for Drafting and Fitting Garments, of which the following is a specification.

Our invention relates to pattern apparatus or devices for developing the necessary size, shape and contour of sections of cloth or similar material of which garments are subsequently made, and the method or process of using such pattern apparatus or devices; and the object of our invention is to provide a structure to be applied to the human form that will enable any one skilled in the art to which our invention relates to readily obtain the contour of such form and develop the same upon the fabric in order that the latter may be cut into sections to be subsequently finished into a garment of perfect fit, or to develop such contour upon paper or other suitable material to form pattern sections by the aid of which the fabric to form the garment may be cut.

A further feature of our invention is the manufacture of forms by the use of our improved pattern apparatus, upon which forms garments may be fitted; such forms having the contour of the person upon which the apparatus has been fitted preliminary to cutting the fabric or the paper pattern by the use of which the fabric may be cut to form the garment. These forms may be made of metal, papier mâché, pasteboard, sized fabric, or any other material suitable for the purpose.

Figure 1:
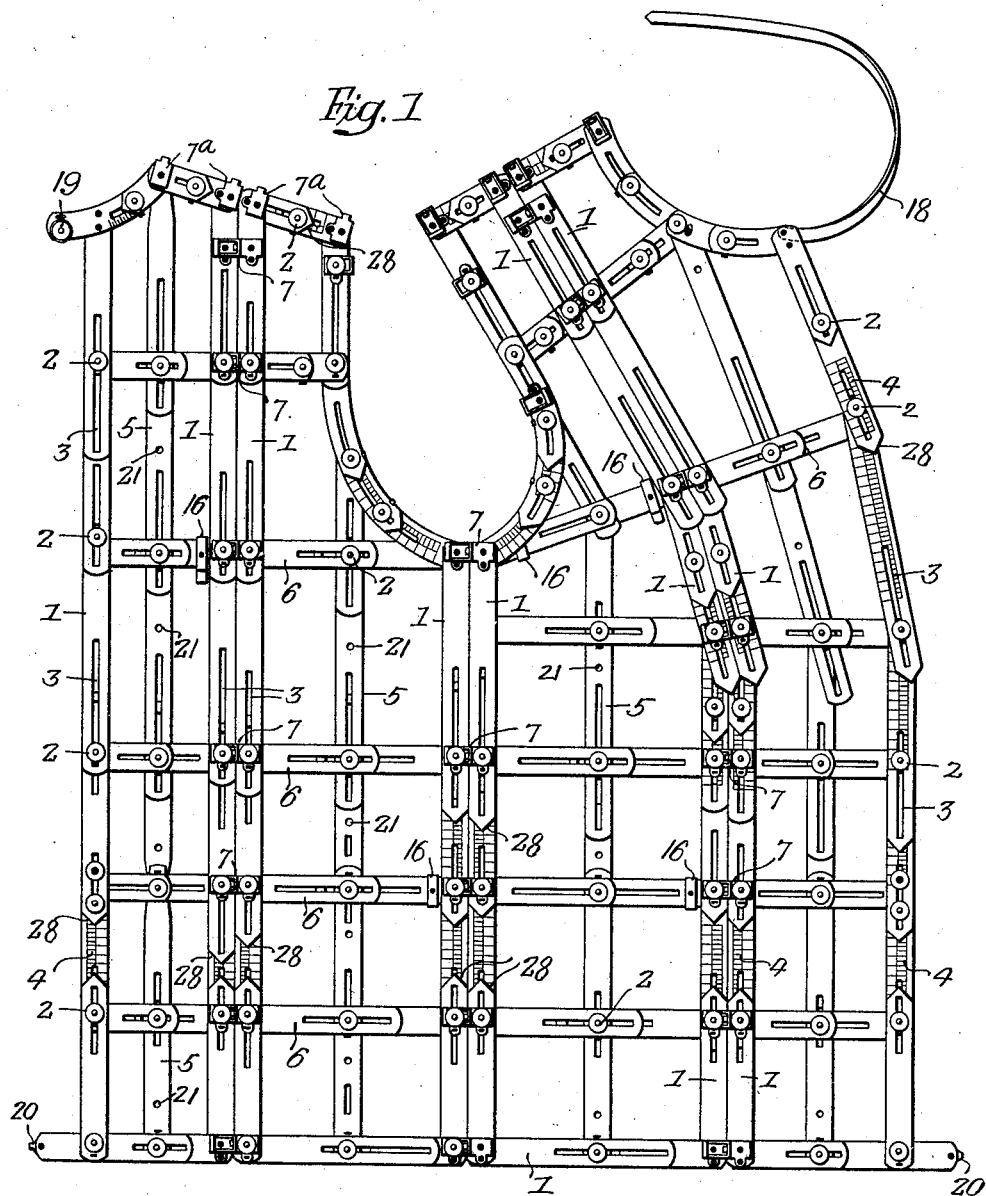
Figure 2:
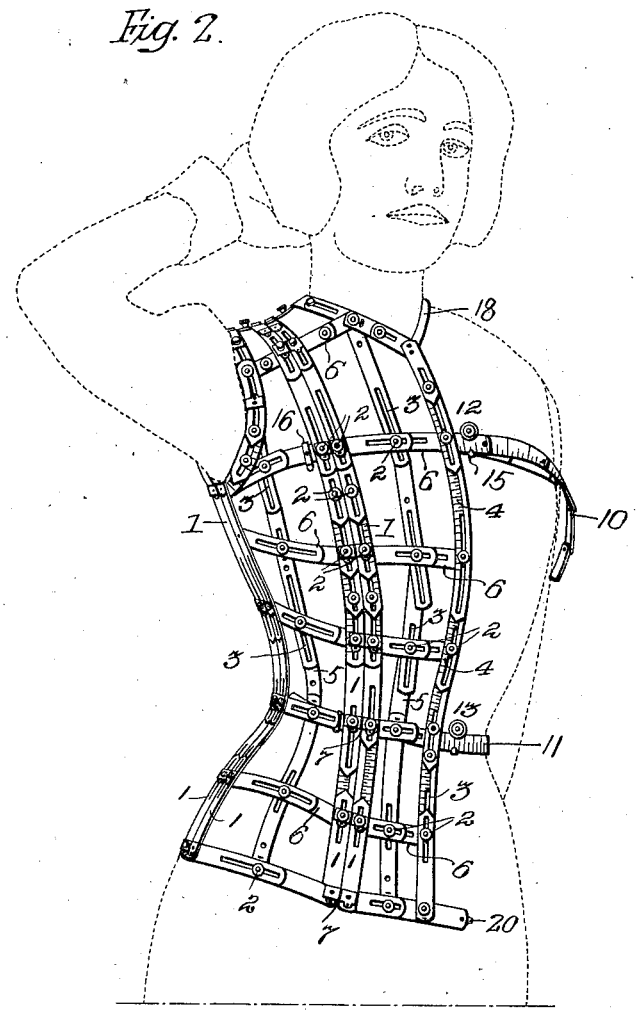
Figure 16:
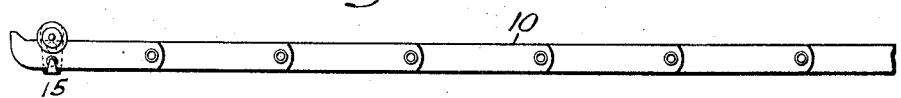

These and other features of our invention are more fully set forth hereinafter, reference being had to the accompanying drawings, in which:

Figure 1, is an elevation of one half of a waist or body pattern apparatus embodying our invention before application to the body, showing the parts extended and the pattern sections lying flat; Fig. 2, is a perspective view illustrating the pattern apparatus disposed upon the body of the person being fitted, looking from the front; Fig. 3, is a similar perspective view illustrating the pattern apparatus disposed upon the body of the person being fitted, looking from the rear; Fig. 4, is a plan view of one of the sections of the pattern apparatus as removed from the body and retaining the curvature of the same; Fig. 5, is a view of the same section shown in Fig. 4, after it has been released from the curved portion; Fig. 6, is a plan view, developed, of a section of the pattern apparatus for cutting a sleeve; Fig. 7, is a perspective view on a reduced scale illustrating the sleeve section of the pattern apparatus connected together and disposed upon the arm of a person to be fitted; Fig. 8, is a diagrammatic view of the contour or marginal outline of the pattern section shown in Figs. 4 and 5; the dotted lines indicating the outline of the section in the position shown in Fig. 4, while the full lines indicate the outline of the section in the position shown in Fig. 5; Figs. 9, 10 and 11, are diagrammatic views illustrating the manner of developing, cutting and shaping a paper pattern from one of the sections of the pattern apparatus for the front portion of a garment; Fig. 12, is a plan view of the fastening device for securing the sections of the pattern apparatus; Fig. 13, is a perspective view of said fastening device; Figs. 14 and 15, are sectional views on the lines $a$—$a$, and $b$—$b$, respectively, Fig. 13, and Fig. 16, illustrates a detail of our invention.

As the fabric employed in the manufacture of garments is flat it is necessary, in applying it to the body in the form of a garment, that the sections of such garment be of such shape as to insure a relatively complete fit following the contour of the body, and that such sections be stretched in some parts and shrunk in others in order that when connected together the finished garment will conform properly to the different curves of the hollows and prominences of the human form, or to such configuration thereof as fashion or the desire of the wearer demands.

Heretofore the stretching and shrinking of the various sections of material or portions of the same comprising the garment necessary to insure a proper fit has been done largely by guesswork upon the part of the tailor or cutter, for the amount to be stretched, or shrunk (or worked) in and the exact places for such stretching or shrinking has never been precisely known in the use of patterns or pattern apparatus for drafting garments, or methods of cutting heretofore employed. Measurements which may be taken for the purpose of forming a pattern by the use of which the fabric is subsequently cut never give the exact results necessary and desirable for the desired fit or conformation of the fabric to the body.

While our improved apparatus is particularly available for use in the cutting and making of what are termed tight fitting garments, it will be understood that loose, or semi-fitting coats, having the desired fit upon one portion of the body; that is to say, the bust and shoulders for instance, with a properly graceful hang therefrom, may be cut by the use of the pattern drafting apparatus forming the subject of our invention.

Deformities of the persons being fitted, such as hollow or sloping shoulders, can be modified and eliminated from the finished garment by extending the strips of the pattern drafting apparatus at those places; such extensions or changes showing the exact amount of padding, wadding, &c., necessary to fill in or shape out such deficiencies or deformities of the human form and give a pleasing and desired effect to the finished garment.

With the use of our improved pattern drafting apparatus, it is possible to determine exactly the precise places at which the fabric must be stretched or shrunk, and the extent of stretching, or the extent of "working in" as the shrinking operation is termed. We believe that we have avoided by said improvements the cause of former defects in the preparation of the pieces of fabric subsequently formed into garments, and have changed the guesswork of the past to an unmistakable certainty.

In the pattern apparatus forming the subject of our invention, the several elements or portions of the same comprise sections made up of marginal sectional members or strips 1, preferably lapping, which strips are secured together by screw clamping means, indicated at 2, or other suitable means at their lapping portions; the several sections of these marginal strips being slotted at 3 in order that the same may slide or move for adjustment with respect to each other. These marginal strips are also provided with dimensional marks 4, which may have indicating numerals, although the employment of the latter is not essential. In addition to the marginal members or strips there is a central sectional element made of a series of members or strips 5, extending throughout the length of the particular section or portion of the pattern apparatus and disposed, during the use of the pattern apparatus in shaping the sections or portions of the same upon the human form, substantially equidistant from the sectional marginal edge strips 1 of said sections. In addition, each section or portion carries sectional cross bars or members 6, disposed substantially at right angles to the marginal members or strips 1 and the central member or strip 5, and these cross bars form what may be termed lines encircling the body in various planes, as clearly illustrated in the perspective views, Figs. 2 and 3; the important one being that disposed at the line or hollow of the waist.

The separate sections or portions of the pattern apparatus; that illustrated in the drawings, for instance, being a coat pattern of which one-half is shown, are connected together at their marginal edges by suitable fastening devices 7, more fully described hereinafter, which devices are designed to hold the sections of the apparatus flat against the body. These fastening members maintain the apparatus in place upon the body of the person for whom the garment is intended, and the curves of the same are taken care of in such pattern apparatus by extending or decreasing the length of the several sectional bars, strips or members making up such pattern apparatus which are held in their adjusted positions by the clamping means indicated at 2. All of the sectional bars, members or strips are secured together by the clamping means 2, which, in some instances, are combined with the fastening devices 7.

When the pattern apparatus is placed upon the body, a pair of bands are also placed thereon; one, indicated at 10, being the bust band, and the other, indicated at 11, being the waist band; such bands being secured at 12 and 13, respectively, at the side bar or marginal edge of the front section of the pattern apparatus, and the marginal edge of such bar is disposed exactly in the center of the body on a vertical line. In the same way, the marginal edge of the rear section of the pattern structure is disposed in a vertical line opposite the center of the body.

The bust band, which is preferably flexible and may be jointed, part of which is shown in Fig. 14, is attached to the front element by a suitable clip or clamp 15, and may be confined in place and to the rest of the pattern apparatus by suitable catches or hooks 16. This band passes entirely around the body and, without being drawn too tightly, is secured by the clip or clamp 15 adjacent the front marginal edge of the front section of the pattern apparatus.

The front end of the band is graduated in inches, and when clamped in place a certain dimension, indicating the bust measure, may be read adjacent the marginal edge of the front section of the pattern apparatus. There are similar graduations on the other end of the band, spaced just half the distance of the graduations on the front end but with the same dimensional marking so that the band at the back of the pattern apparatus must be positioned with respect to said pattern with the same dimension or dimension indication adjacent the marginal edge of the back section of the pattern apparatus.

The waist band is adjusted and employed in precisely the same manner as the bust band, and in addition to these means for holding the pattern apparatus against the body while the contour of the same is being taken, we provide a neck strip 18 carried by one of the sections of the pattern apparatus, preferably the front section or element, at the corner of the same, which strip may be passed around the neck of the wearer opposite the side upon which the pattern apparatus is disposed and confined at the rear by a clip or fastener 19 carried by one of the pattern sections.

The bust and waist bands hold the pattern apparatus in place upon the body and when the center of the body is found at the front, the center of the rear is indicated at the rear of the several bands by numbers or dimensions of the same kind.

It is quite essential, in the use of our pattern apparatus, that the marginal lines of the front and back sections be disposed in the vertical center of the body or directly adjacent vertical lines representing such center. To facilitate this adjustment, the seam of a garment worn by the person being fitted may be considered, and where such seam is lacking, measurements should be taken to indicate on the garment worn during the application of the pattern structure the exact vertical center of the body. If necessary, on account of differences in the shape of one side or the other of the body it may be desirable to fit both sides independently. When these central points have been determined and the bust and waist bands have been set in place, the rest of the pattern sections may be readily adjusted by the securing means for the several bars or strips of the same, care being taken to insure that the central sectional bars or strips of each pattern section or element are substantially midway or intermediate the side or marginal bars or strips when the pattern apparatus is placed upon the body, and extend vertically of the same. The bottom marginal bars of each section or element of the pattern apparatus, which extend around the body of the wearer in a substantially horizontal plane, have end eyes 20 which may be pinned to the skirt of the person being fitted; care being taken, however, to insure that such pinning does not affect or change the vertical position of the marginal bars of the front and back pattern sections or elements.

The central sectional bars or strips of each pattern section are perforated at intervals, as indicated at 21, for a purpose to be described hereinafter.

The pattern section for forming the sleeve is employed in a manner substantially similar to that for forming the body of the garment, excepting that the central bar of the upper part of the same is of considerable width, while the element for the under portion employs a pair of sectional bars or strips only.

The section forming the under sleeve has a hook 25 adjacent the arm hole, which hook is adjustable with respect to the member carrying the same and may be hung upon the body portion of the pattern apparatus in the arm hole of the same. This arrangement of the structure is designed to give the sleeve the proper balance; the arm pattern structure sliding so as to find its right balance. This condition may also determine where the front seam may be placed, or the pattern apparatus may be shifted to change the position of the seam without interfering with the balance, as the hook is disposed in a slotted portion of this section of the pattern apparatus. The under section preferably carries a pair of tapes 26 whereby this portion of the sleeve pattern structure may be tied to the arm to secure the contour of such part of the body.

The under portion or section of the sleeve pattern structure carries a member 27 which is to be raised to the height and contour of the arm pit and then secured in place by the clamping means 2. The sections of the sleeve pattern structure are now to be joined together by the clasps or fastenings 7 at the marginal edges of said pattern sections, and the length of the connecting bars between the central bars and the marginal bars may be adjusted by means of the adjustable strips or elements retained in place by the screw clamping means 2.

Before removing the sleeve pattern structure from the arm or from its engagement with the other sections of the pattern apparatus to which it may be secured by the fastenings 7, as shown, the extreme upper points of the under arm section are to be indicated by suitable marks upon the marginal bars or strips of the arm hole portion of the body pattern apparatus, which marks are to be transferred to the fabric, so that when the sleeve is sewn to the body of the garment, the proper balance will be preserved. The pattern may be removed from the arm by untying the tapes 26 which should be disposed at a point where they can be readily reached when such portion of the pattern apparatus is to be removed.

When the fitting or shaping of the pattern apparatus is satisfactory to the cutter, tailor, or the person desiring the garment, the screw elements of the clamping means 2 holding together the several strips or bars making up the section elements of the pattern apparatus are tightened, and then the same may be removed from the body by loosening the fastening means holding the several bands encircling the body at the neck, bust and waist. The apparatus may then be dissected by separating the fastening devices 7 at the marginal edges of the pattern sections. It will be noted now that the dissected sections when placed on the cutting board do not lie perfectly flat, but retain the same curves they were given when fitted upon the body of the person. At each part along the marginal line of the sectional elements of the pattern apparatus, where stretching or contracting is to be performed, the strips or bars are graduated and marked in fractions of an inch to indicate the exact amount of expansion or contraction imparted to the marginal edges in fitting the pattern apparatus upon the body.

In some instances, it may be necessary or desirable to have an extra seam in the garment; such condition depending somewhat upon the style of the garment, upon the size or configuration of the person to be fitted, or the fabric. Some fabrics might stretch enough to permit the employment of a single piece cut from the pattern section or element shown in Figs. 4 and 5, while in other instances, it may be necessary to employ two pieces, separated on the center line of such pattern section, which pieces are to be sewn together on such line in the formation of the garment; such separation permitting the desired shaping at the marginal edges of the two pieces at the separated part to insure the desired fit.

In laying off the contour of a portion of this pattern apparatus, that of the element or section shown in Fig. 4, for instance, the center bars are held down against the cutting board by means of tacks before the strips or bars 1 forming the marginal lines of the pattern sections are loosened. The contour or marginal outline of this pattern section is then traced entirely before any of the screw elements of the clamping means are loosened, and then the waist line, width, and all of the notches (opposite the fastening devices 7) which register with the next section are marked. The screw elements of the clamping means 2 holding the central sectional strips or bars and the horizontal sectional strips or bars are then released, allowing the latter to expand as much as they will, and after the sectional strips or bars have expanded to the full extent, these screw elements are again tightened. The fastening means holding the marginal sectional strips or bars 1 of the pattern section are now released, causing the said strips or bars to change their relation or position, and when this is done, the pattern element or section is lying substantially flat upon the cutting board. The contour or marginal outline of the same is again traced, and the result of these two operations is shown in the diagrammatic view, Fig. 8. In addition to these contour markings, the center line should be indicated by marks placed in the slots of the center bar sections, the waist line should also be indicated, and other marks to indicate the points at which the sections have been connected; which latter points must register when the sections of fabric are subsequently connected or sewn together to form the garment.

After the screw elements of the clamping means securing the strips or bars forming the margins of the pattern section have been released; permitting a change in the contour of the same, the changed positions of the notches are indicated, and at the same time care must be taken to observe the difference in dimension in the marginal strips between the original position of said notches and the second position of the same, and this difference will indicate on the one hand, the amount to be stretched, and on the other hand the amount to be worked in. The strips, or certain of the same, have pointed ends 28 to facilitate reading of the dimensions. When this pattern section is lifted from the board, it will be noticed that the contour or marginal outline of the pattern section as shown in Fig. 4, from A to B, has been changed to a greater width, which difference is to be taken off relatively from the sides of a central line passing through the section of fabric as indicated by the dotted lines, thereby changing this fabric section into two separate pieces.

If a paper pattern of the various sections or elements of the pattern apparatus is desired, each of said sections or elements must be secured to the work board or cutting table by holding down the central bar of the same in the manner just described, which action may be readily performed by thumb-tacking the same to the board; the tacks entering the apertures 21 in said central bars of the pattern elements. These central bars will lie flat without any twisting, and this laying of the pattern upon the board is to be done before any of the screw elements of the clamping means holding the marginal strips or bars of the pattern section are loosened. Under these conditions, the strips or bars forming the marginal lines of the section of the pattern apparatus covering the piece of fabric where such seam is to be put in are first released, taking care to notice the amount of stretching or contraction necessary by observing carefully the position of the graduated strips. The contour or marginal outline of this section of the pattern apparatus is then traced, after which it is cut in the center, as shown in the diagrams, Figs. 9, 10 and 11, which part is straightened by working in or stretching to the amount shown by the graduated marginal bars or strips of the pattern sections. In the place where stretching is shown, the paper pattern should be cut at the edge and stretched before straightening, as indicated at 30, and where it shows to be "worked in" or "shrunk in," such paper pattern should also be cut at the edge and folded over or "shrunk in," as indicated at 31.

To obtain a record of the amount of material to be stretched or worked in and thereby secure the necessary curvature or contour of the garment, the position of the ends of the pointed sections of the strips with respect to the graduations on said strips must be noted before loosening the screw elements of the clamping means 2, and also after loosening such screw elements. If the marginal lines contract on releasing said screw elements, the difference indicated is the amount to be stretched on the fabric at the points indicated. If on the other hand the marginal lines expand or stretch on loosening the screw elements of the clamping means, the difference represents the amount of material to be "worked in" or shrunk on the fabric. This stretching or working in of the fabric is to be effected between the central portion and the respective marginal edges of the fabric sections only.

The clasps or fastening devices 7 occupy substantially definite points, and their position serve as balance marks; the pattern being notched at such points; such notches meeting when the seams are sewn so that no displacement of balance in the finishing of the garment is possible. It will be understood, therefore, that it is a simple matter to ascertain the amount of contraction and expansion the marginal portion of the pattern sections have undergone in conforming to the body of the wearer so that when such sections are brought to the flat condition for the purpose of cutting the garment, the difference between such flat condition and the curved condition is readily ascertained, giving the exact amount of stretch or "working in" to be imparted to the material to insure that the finished garment conforms exactly to the human figure and will, therefore, set or fit on the body of the wearer without bulging or wrinkling, and without the tightness frequently experienced in garments incorrectly cut.

While the pattern apparatus is shown and described with reference to a body garment for women, an outer coat or suit coat for instance, it will be understood, of course, that similar pattern drafting apparatus may be employed in connection with any portion of such garment and with any other garment designed for the human form or part of the human form, for men, women or children.

The production of a loose fitting garment may be accomplished by loosening the waist band to the extent required to secure the desired looseness of fit, care being taken to insure that the marginal edge of the front pattern section is opposite the same dimension marking on the band as the marginal edge of the rear pattern section. Between these two points all of the substantially vertical bars or elements of the pattern sections, together with the necessary horizontal connecting elements, may be loosened, so that the proper positioning of the same between the marginal edges, front and rear, of the pattern as a whole may be effected; that is to say, the central bars or strips of each pattern section should be, relatively speaking, midway between the marginal or edge bars of each section.

In the development of the paper patterns from which the garment may be subsequently cut from a loose condition of the pattern apparatus, the same method of procedure is followed as with the pattern apparatus when employed as a means of developing a tight fitting garment.

The most important feature of our invention is the sectional character of the apparatus, the sectional elements of the same being secured together at their marginal edges, and the fastening members effecting such result forming guide points which subsequently match or register when the fabric section, or the pattern for cutting such fabric section subsequently forming part of a garment, is made from the pattern apparatus placed upon the body of the person for which the garment is desired.

Both the bust and waist bands are flexible, being made, preferably, as is also the rest of the pattern sections, from strips of celluloid, and the bust band is further made up of jointed sections, as shown in Fig. 16.

The sectional bars or strips making up the pattern drafting apparatus are slotted at intervals throughout their length, as indicated at 32, and these strips are secured together by clamping members 2 comprising screw shanks 35 with heads 36, having projections 37 adapted to enter said slots, or apertures in the strips, and prevent the screw shanks turning when nuts, as 38, are applied to said screw shanks.

The separate pattern elements are secured together at their marginal edges by suitable fastening devices 7, comprising a pair of members; that indicated at 7$^a$ being what may be termed a "hook" member, while that indicated at 7$^b$ may be termed an "eye" member.

The "hook" member may comprise a flat plate or element 39, substantially rectangular in shape, which may be secured in place to the strips of the pattern sections by the clamping means 2, comprising the screw shanks 35 and nuts 38; said plate being provided with a laterally disposed projection 41, apertured at 42 for the passage of the projection 37 of the clamping device. The hook proper of the "hook" member may be formed from a relatively narrow tongue 43, integrally connected to the plate 39, and slightly raised above the plane of the same; the forward end being bent back in the manner indicated in Fig. 15, to form a thickened shouldered projection 44.

The "eye" member comprises a substantially rectangular plate 45, with a spring element 46 superposed thereon also rectangular in form and having its central portion removed so that it is shaped substantially like a frame. This plate is secured to the strips of the pattern section in the same manner as the plate 39, and is provided with the apertured projection 41 for the same purpose. The spring element 46 may be secured in place by bending over the rear end of the plate 45 and compressing the metal of the same into the rear edge of the spring frame, as illustrated at 47 in Figs. 12, 13 and 15. The forward end of the plate 45 is shorter than the spring element 46, and at its central part it may be beveled at 48, affording provision for the ready entrance of the projection 44 of the "hook" member, which pushes the end of the spring frame up out of the way when entering; the forward bar of said spring frame engaging the rear wall of said hook 44. To disconnect this fastening device it is only necessary to raise or bend up the "hook" member with respect to the "eye" member to effect automatic separation of the hook or projection 44 from its engagement with the spring element 46.

No claim is herein made to our improved fastening device, since the same forms the subject of a companion application for patent, filed of even date herewith Serial No. 635,841.

We claim:

1. Pattern drafting apparatus comprising a flexible sectional frame consisting of a plurality of independent separable pattern sections, each of said sections being made up of a plurality of adjustable flexible sectional strips disposed substantially at right angles to each other and adapted to conform to portions of the body to be fitted, means for retaining the adjustable sectional strips in their extended and contracted positions, means carried by the marginal edges of the pattern sections for detachably connecting the latter together, and a plurality of body encircling tapes adapted to draw said pattern sections to the body.

2. In pattern drafting apparatus comprising a plurality of sectional frames made up of sectional strips adjustably connected together and adapted to fit over the human frame and conform to the contour or curvature of the same, said strips being slit with clamping members adapted to said slits the combination of longitudinally adjustable strips forming the marginal edges of said frames, supplemental longitudinal strips disposed substantially intermediate said marginal strips, adjustable cross strips disposed substantially at right angles with respect to said supplemental median strips and the marginal strips, all of said strips being flexible and adjustable in varying degree with respect to each other to permit expansion and contraction in their length whereby they may follow the contour of that portion of the body over which they are placed, the clamping means for securing said strips in their adjusted positions being held against rotative movement when tightened and loosened means for detachably connecting the marginal edges of the several sectional frames and a body encircling tape to draw said sections to the body.

3. A tailor's pattern harness comprising separate sections corresponding in skeleton to the pieces of the garment to be made and having means for connecting and disconnecting them, said sections being formed of tapes of comparatively stiff though flexible material, each section comprising vertical members and extensible transverse members which are adjustable up and down and connect said vertical members at different heights, said transverse members being formed of overlapping tapes slidably connected with each other, and clamps for securing said members at any desired adjustment up and down or horizontally, in combination with continuous body encircling tapes adapted to draw said members against the body.

In testimony whereof, we have signed our names to this specification, in the presence of two subscribing witnesses.

LOUIS S. D'ORSOGNA.
PIETRO CANE.

Witnesses:
  DOMENICA MARRONE,
  NICOLA D'ORSOGNA.

Copies of this patent may be obtained for five cents each, by addressing the "Commissioner of Patents, Washington, D. C."